(12) United States Patent
Ramirez et al.

(10) Patent No.: US 11,173,743 B2
(45) Date of Patent: Nov. 16, 2021

(54) WHEEL ASSEMBLY

(71) Applicant: Ford Global Technologies, LLC, Dearborn, MI (US)

(72) Inventors: Diego Raúl Ramirez, Ecatepec de Morelos (MX); Juan Rosales, Axapusco (MX); Francisco Vargas, Cuautitlan Izcalli (MX); Jaime Sanchez Mendoza, Tlalnepantla (MX); Thananphat Siprajan, Cuautitlan Izcalli (MX)

(73) Assignee: Ford Global Technologies, LLC, Dearborn, MI (US)

( * ) Notice: Subject to any disclaimer, the term of this patent is extended or adjusted under 35 U.S.C. 154(b) by 376 days.

(21) Appl. No.: 16/360,808

(22) Filed: Mar. 21, 2019

(65) Prior Publication Data
US 2020/0298617 A1    Sep. 24, 2020

(51) Int. Cl.
*B60B 7/06* (2006.01)
*B60B 7/02* (2006.01)
*B60B 7/00* (2006.01)

(52) U.S. Cl.
CPC ............ *B60B 7/066* (2013.01); *B60B 7/0013* (2013.01); *B60B 7/02* (2013.01)

(58) Field of Classification Search
CPC .......... B60B 7/066; B60B 7/0013; B60B 7/02
See application file for complete search history.

(56) References Cited

U.S. PATENT DOCUMENTS

| | | | |
|---|---|---|---|
| 3,894,775 A * | 7/1975 | Christoph | B60B 7/068 301/37.35 |
| 4,004,837 A | 1/1977 | Main | |
| 4,729,606 A | 3/1988 | Narita et al. | |
| 7,452,037 B1 | 11/2008 | Nunes | |
| 8,342,613 B2 | 1/2013 | Russell | |
| 8,764,122 B1 * | 7/2014 | Chalk | B60B 7/0013 301/111.03 |
| 9,676,230 B2 * | 6/2017 | Perez Rojo | B60B 7/08 |
| 2015/0035348 A1 | 2/2015 | Wang | |
| 2018/0072094 A1 * | 3/2018 | Hsieh | B60B 7/068 |

* cited by examiner

*Primary Examiner* — Kip T Kotter
(74) *Attorney, Agent, or Firm* — Ray Coppiellie; Bejin Bieneman PLC

(57) ABSTRACT

A wheel assembly includes a wheel having a surface and defining a plurality of slots and a cap having a cap surface. The cap includes a plurality of positioning posts extending from the cap surface, each positioning post including a pillar and a stop fixed to the pillar. The pillar extends farther from the cap surface than the stop. The stop has a distal end. Each pillar is received by one of the slots of the wheel and the distal end of each stop is engaged with the surface of the wheel.

20 Claims, 6 Drawing Sheets

WHEEL ASSEMBLY

BACKGROUND

Wheel assemblies in some vehicles include a wheel and a center cap. The cap is attached to the wheel. The cap typically provides a stylized appearance for the wheel. The cap may protect components of the wheel assembly, e.g., lug nuts, bearings, bolts etc., from exposure to external contaminants. For example, the cap may protect the components from, e.g., rain, snow, sleet, mud, etc.

The cap may be attached to the wheel with one or more features. However, the features may be difficult to mold on a surface of the cap. Further, the cap may be rotationally movable relative to the wheel or may be positioned at a depth relative to the wheel that may not be aesthetically pleasing and may not protect components of the wheel assembly. There remains an opportunity to design features to attach the cap to the wheel to provide a specific orientation and a specific depth relative to the wheel.

DETAILED DESCRIPTION

Figure 1:
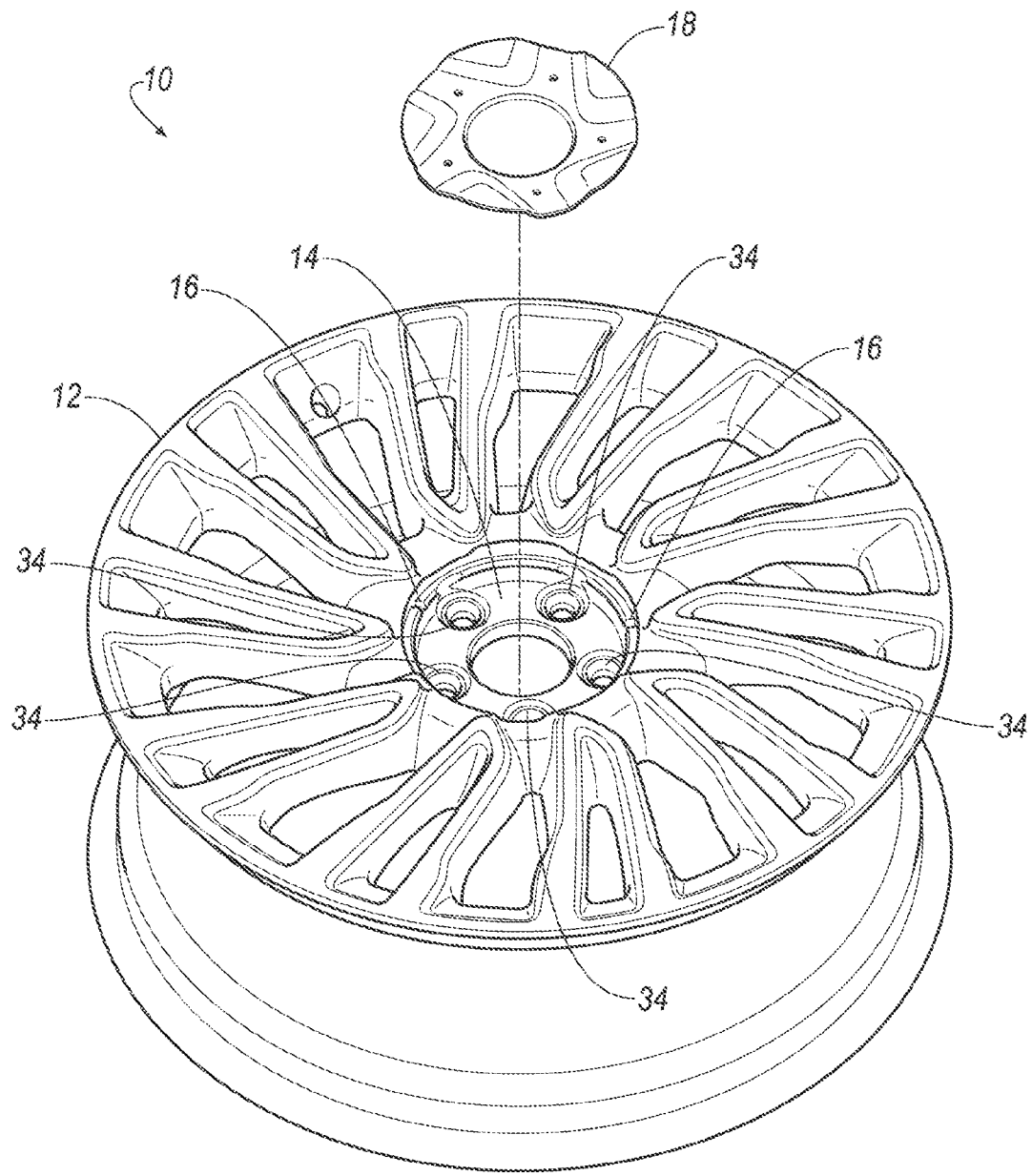
FIG. 1 is an exploded view of a wheel assembly.

A wheel assembly includes a wheel having a surface and defining a plurality of slots and a cap. The cap has a cap surface and including a plurality of positioning posts extending from the cap surface. Each positioning post includes a pillar and a stop fixed to the pillar, the pillar extending farther from the cap surface than the stop, the stop having a distal end. Each pillar is received by one of the slots of the wheel. The distal end of each stop is engaged with the surface of the wheel.

When the slots receive the pillars, the cap may be rotatably fixed relative to the wheel.

The cap may define a circumference and may include a plurality of stops substantially equally spaced along the circumference.

The wheel may have a center and the slots may define a chord extending away from the center.

The cap may further include a plurality of clips engaged with the surface of the wheel.

The cap may define a circumference and the clips may be substantially equally spaced along the circumference.

The plurality of clips may include at least three clips.

Each stop may have a substantially arcuate cross-section.

Each pillar may have a substantially arcuate cross-section.

The cap surface and the positioning posts may be unitary.

The wheel may include a plurality of bolt receivers.

The cap may include a plurality of stops, the plurality of stops and the plurality of positioning posts equaling the plurality of bolt receivers.

The cap may include a plurality of clips that equals the plurality of bolt receivers.

The wheel may include a ledge, and the distal end of each stop may be engaged with an outer surface of the ledge.

The ledge may have an inner surface and the cap may include a plurality of clips extending from the cap surface, each clip engaged with the inner surface of the ledge.

Each clip may include an angled surface engaged with the inner surface of the ledge.

The ledge may define at least two slots.

The slots may be positioned to specify an orientation of the cap relative to the wheel when the positioning posts engage the slots.

The pillars may be designed to prevent rotation of the cap upon receipt by the slots.

With reference to the Figures, wherein like numerals indicate like parts throughout the several views, a wheel assembly 10 of a vehicle includes a wheel 12 having a surface 14 and defining a plurality of slots 16 and a cap 18 having a cap surface 20. The cap includes a plurality of positioning posts 22 extending from the cap surface 20, each positioning post 22 including a pillar 24 and a stop 26 fixed to the pillar 24. The pillar 24 extends farther from the cap surface 20 than the stop 26. The stop 26 has a distal end 28. Each pillar 24 is received by one of the slots 16 of the wheel 12 and the distal end 28 of each stop 26 is engaged with the surface 14 of the wheel 12.

The cap 18 includes features to perform three functions for proper assembly of the cap 18 to the wheel 12: preventing the cap 18 from rotating relative to the wheel 12, maintaining alignment of the cap 18 with the surface 14 of the wheel 12, and locating the cap 18 in a single position relative to the wheel 12, i.e., along a cross-vehicle axis. The positioning posts 22 perform all three of these features. The positioning posts 22 place the cap 18 at a specified orientation, preventing rotation of the cap 18 relative to the wheel 12. The positioning posts 22 dispose the cap 18 a specified depth relative to the wheel 12, preventing overtravel and maintaining alignment of the cap 18 with the wheel 12. The slots 16 are disposed such that the pillars 24 can only enter the slots 16 when the cap 18 is at a specific orientation relative to the wheel 12, locating the cap 18 in a single position relative to the wheel 12. The stops 26 engage the surface 14 of the wheel 12 to prevent the cap 18 from extending beyond the specified depth. The positioning posts 22 are designed for ease of tooling, weight reduction, and reduction in design complexity, resulting in less expensive manufacturing of the cap 18. The slots 16 are designed in a poka-yoke manner such that the positioning posts 22 can only engage the slots 16 when the cap 18 is at a specified orientation relative to the wheel 12.

The wheel assembly 10 includes the wheel 12. The wheel 12 supports a tire (not shown) for use in the vehicle. The wheel 12 has a center 30. The wheel 12 defines the plurality of slots 16 that receive the pillars 24 of the positioning posts 22. The slots 16 are positioned to specify an orientation of the cap 18 relative to the wheel 12 when the positioning posts 22 engage the slots 16.

The slots 16 may define a chord 32, i.e., a line that does not cross the center 30 of the wheel 12. Because the slots 16 define a chord 32, the cap 18 is rotated to a specific orientation to align the positioning posts 22 with the slots 16. That is, if any one of the positioning posts 22 is placed in a wrong slot 16, one of the slots 16 will remain empty and one of the positioning posts 22 will be positioned on a portion of the wheel 12 unable to receive the positioning post 22. Thus, the slots 16 ensure a specified rotated position of the cap 18 relative to the wheel 12.

Figure 3:
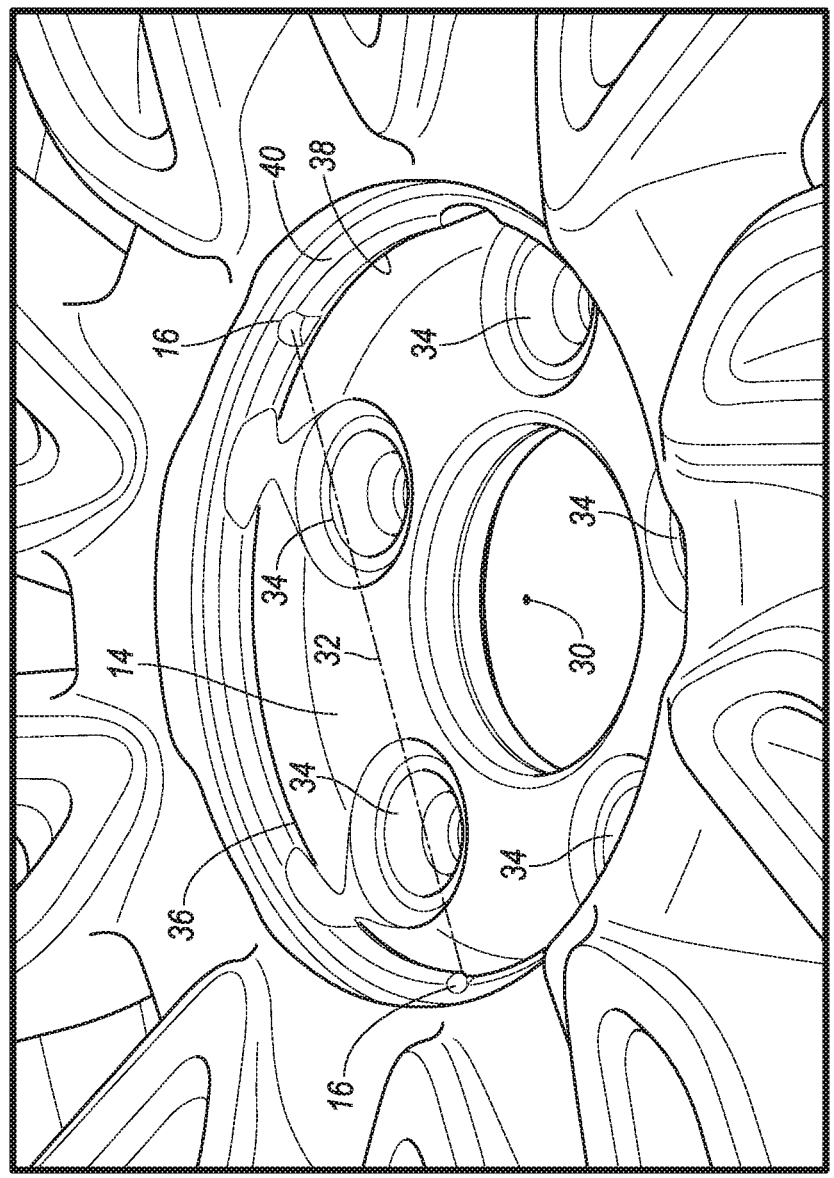
FIG. 3 is a magnified view of a wheel of the wheel assembly.

The wheel 12 includes a plurality of bolt receivers 34. The bolt receivers 34 are designed to receive a bolt (not shown) to secure the wheel 12 to a wheel hub (not shown) of the vehicle. The wheel 12 may include five bolt receivers 34, as shown in FIGS. 1 and 3. Alternatively, the wheel 12 may include a different number of bolt receivers 34 suitable to secure the wheel 12 to the wheel hub.

Figure 5:
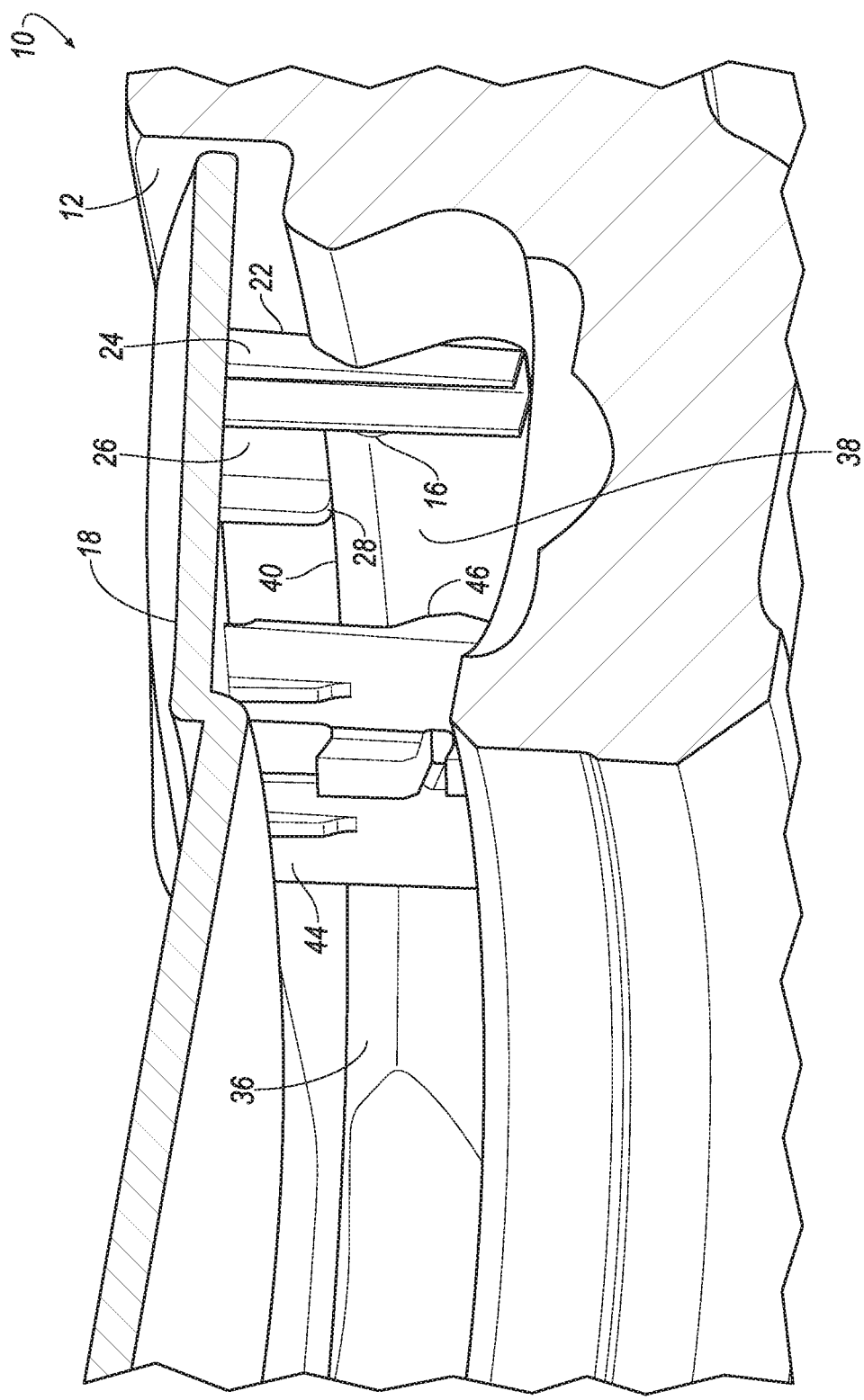
FIG. 5 is a magnified view of the cross-section of the cap and the wheel.
Figure 6:
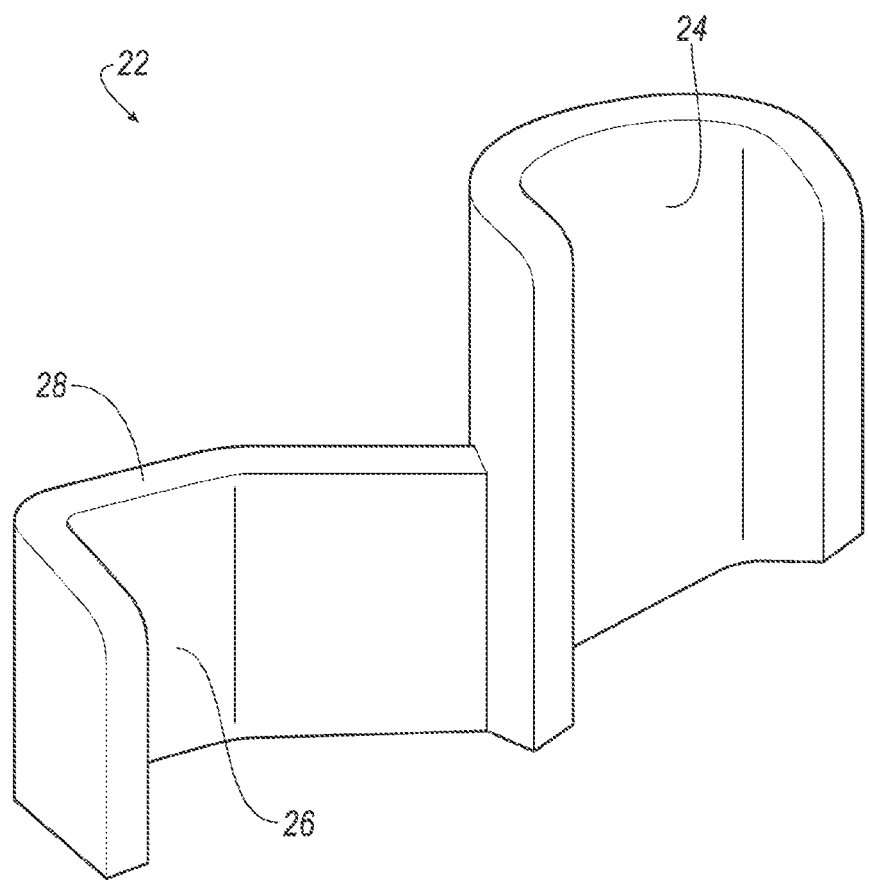
FIG. 6 is a perspective view of a positioning post.

The wheel 12 may include a ledge 36, as shown in FIGS. 3, 5. The ledge 36 may extend from the surface 14 of the wheel 12. The ledge 36 may extend around the wheel 12. The ledge 36 may have an inner surface 38 and an outer surface 40. The inner surface 38 faces an interior of the vehicle, and the outer surface 40 faces an exterior of the vehicle. The inner surface 38 opposes the outer surface 40. That is, the inner surface 38 faces in a substantially opposite direction than the outer surface 40. For example, the inner surface 38 may face in a vehicle-inboard direction and the outer surface 40 may face in a vehicle-outboard direction. The inner surface 38 may be inclined. The outer surface 40 may be positioned at a specific depth within the wheel 12.

The ledge 36 may define the slots 16, as shown in FIGS. 1, 3-5. That is, the slots 16 extend into the ledge, e.g., radially and the positioning posts 22 may extend into the slots 16 defined by the ledge 36. When the positioning posts 22 extend into the slots 16 of the ledge 36, the positioning posts 22 rotationally secure the cap 18 to the wheel 12. The ledge 36 may define two slots 16, as shown in FIGS. 1, 3-5. Alternatively, the ledge 36 may define a different number of slots 16, e.g., more than two slots 16.

The wheel assembly 10 includes the cap 18, as shown in FIGS. 1-2, 4-5. The cap 18 attaches to the wheel 12, covering the bolt receivers 34. The cap 18 may protect components of the wheel 12 from contaminants, e.g., water, snow, dirt, mud, etc. For example, the cap 18 can cover bolts received by the bolt receivers 34. The cap 18 may be substantially circular. The cap 18 may define a circumference 42, i.e., a circular dimension about a center of the cap 18. The cap 18 has the cap surface 20.

The cap 18 includes the plurality of positioning posts 22 extending from the cap surface 20, as shown in FIGS. 2, 4-6. The positioning posts 22 align the cap 18 to the wheel 12 in a specified orientation and to a specified depth relative to the wheel 12. The positioning posts 22 prevent rotation of the cap 18 relative to the wheel 12 and prevent the cap 18 from extending toward the wheel 12 beyond the specified depth.

Each positioning post 22 includes a pillar 24, as shown in FIGS. 2, 4-6. The pillars 24 extend from the cap surface 20 into the slots 16. The pillars 24 may be designed to prevent rotation of the cap 18 upon receipt by the slots 16, i.e., when the slots 16 receive the pillars 24, the cap 18 is rotatably fixed relative to the wheel 12.

Each pillar 24 may have a substantially arcuate cross-section, as shown in FIGS. 2, 4-6. The arcuate cross-section may provide specified strength and deformation characteristics suitable for securing the cap 18 to the wheel 12. The arcuate cross-section of the pillar 24 may provide ease in manufacturing, reducing machining and/or molding time and cost of the pillar 24.

Figure 2:
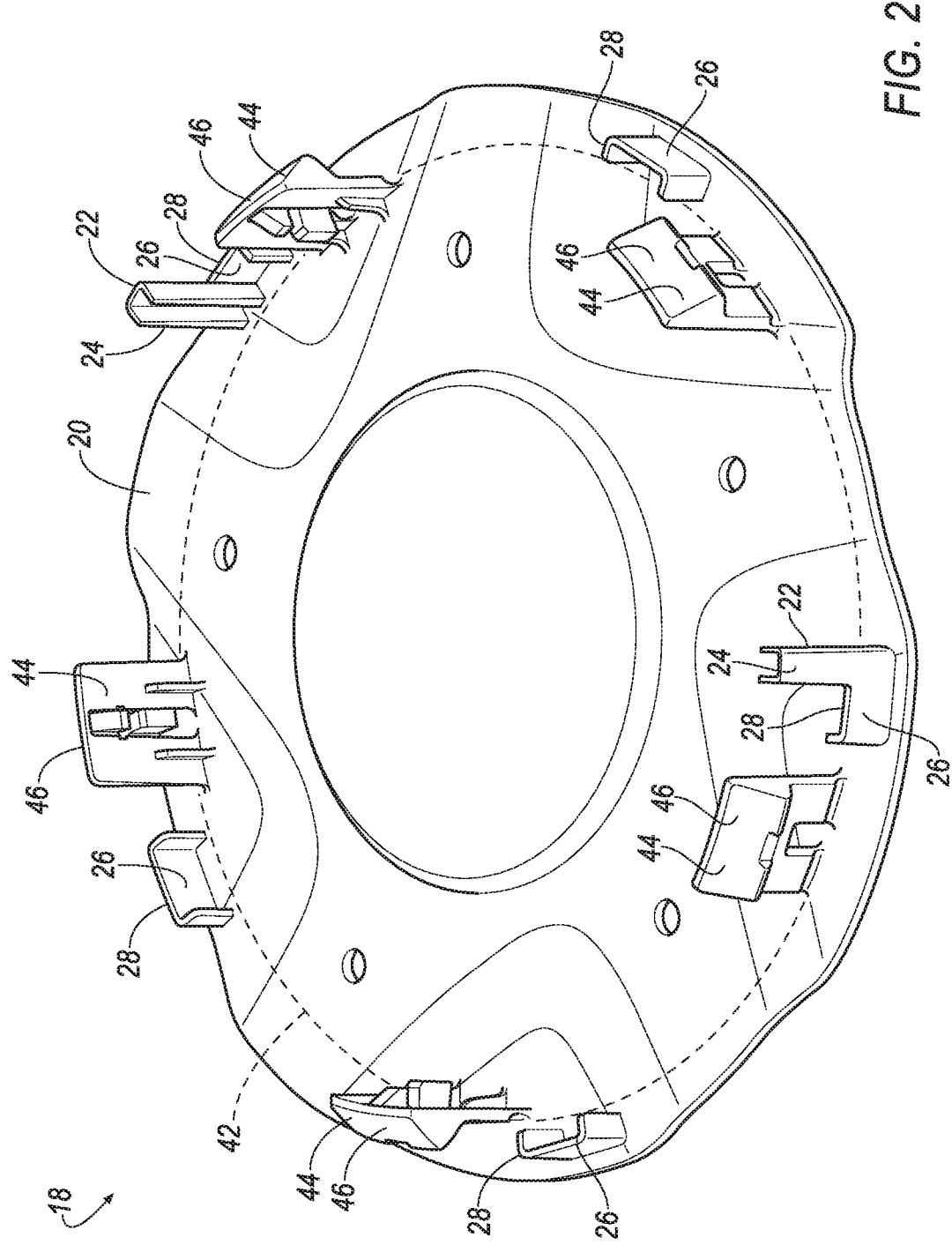
FIG. 2 is a perspective view of a cap of the wheel assembly.

Each positioning post 22 includes a stop 26, as shown in FIGS. 2, 4-6. The stops 26 prevent movement of the cap 18 toward the wheel 12. The stops 26 extend from the cap surface 20. The cap 18 may include a plurality of stops 26 that are not part of a respective positioning post 22. That is, the cap 18 may include a greater number of stops 26 than positioning posts 22. For example, as shown in FIG. 2, the cap 18 may include five stops 26, two of which are part of respective positioning posts 22, and three that are disposed on the cap surface 18.

Each stop 26 may have a substantially arcuate cross-section, as shown in FIGS. 2, 4-6. The arcuate cross-section may provide specified strength and deformation characteristics suitable for preventing the cap 18 from moving closer to the wheel 12 than the specified depth. As described above, the arcuate cross-section may ease manufacturing, reducing machining and/or molding time and cost.

The cap surface 20 and the positioning posts 22 may be unitary, i.e., formed simultaneously as an integral construction. A unitary construction allows for a more efficient manufacturing process and fewer stress concentration points. Alternatively, the cap surface 20 and the positioning posts 22 may be formed separately and later joined by any suitable method, e.g., fusing, fastening, brazing, welding, adhesives, etc. Yet alternatively, the pillar 24 and the stop 26 of the positioning post 22 may be formed separately and later joined by any suitable method, e.g., fusing, fastening, brazing, welding, adhesives, etc.

The stops 26 may be substantially equally spaced along the circumference 42 of the cap 18. For example, the cap 18 may include five stops 26, two of which are part of the positioning posts 22, disposed at substantially 72 degree intervals along the circumference 42. Alternatively, the stops 26 may be spaced in a suitable arrangement along the circumference 42. Positioning the stops 26 substantially equally along the circumference 42 distributes forces applied normal to the cap 18 substantially equally among the stops 26.

The distal end 28 of each stop 26 may be engaged with the outer surface 40 of the ledge 36. The distal end 28 of each stop 26 may contact the outer surface 40, preventing further intrusion of the cap 18 toward the wheel 12. Because the outer surface 40 of the ledge 36 may be positioned at a specific depth within the wheel 12, when the distal ends 28 of the stops 26 engage the outer surface 40, the distal ends 28 of the stops 26 position the cap 18 at the specified depth. That is, the ledge 36 may be designed to position the cap 18 at the specified depth.

Figure 4:
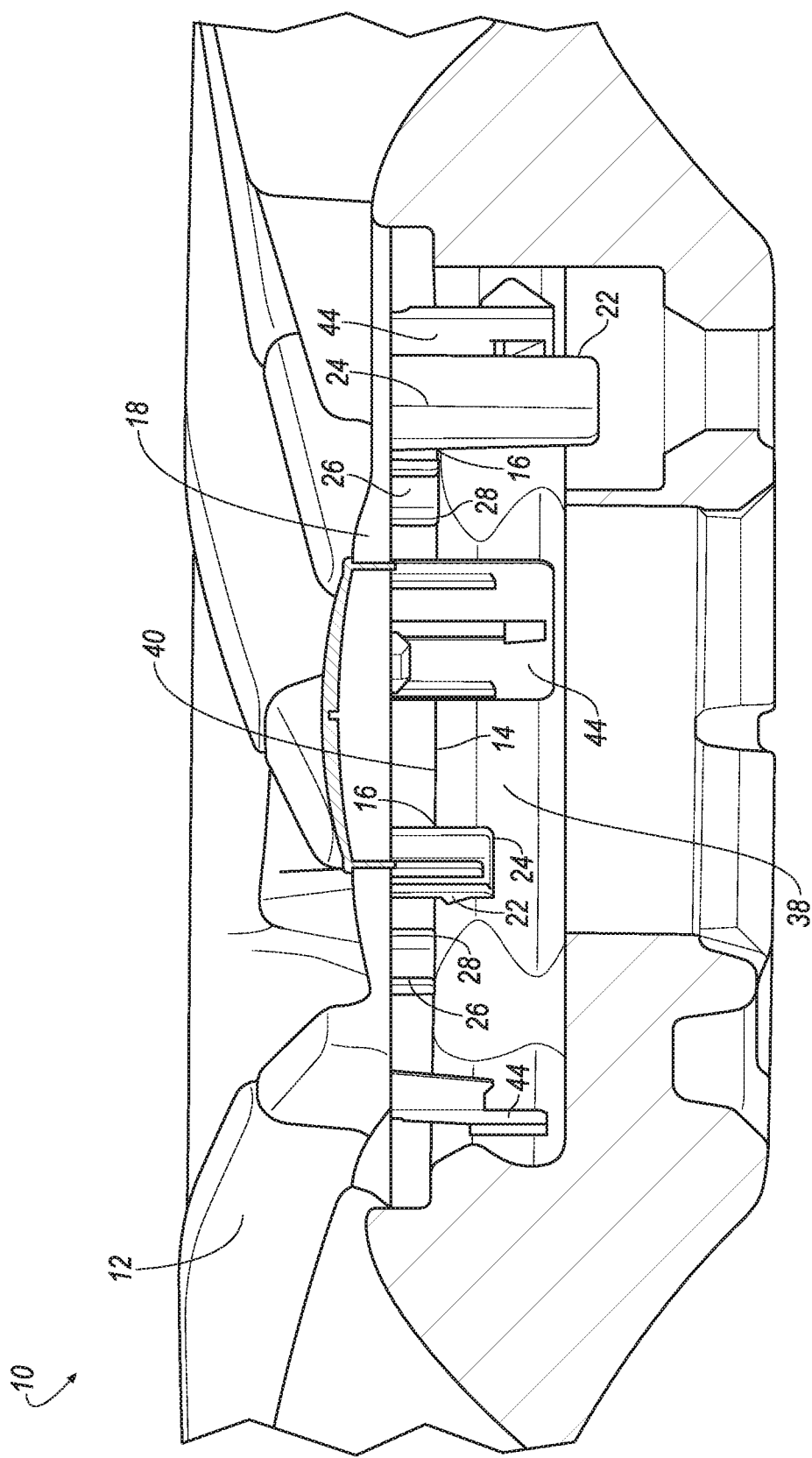
FIG. 4 is a cross-sectional view of the cap and the wheel.

The cap 18 may include a plurality of clips 44, as shown in FIGS. 2, 4-5. The clips 44 may engage the surface 14 of the wheel 12, securing the cap 18 to the wheel 12. The cap 18 may include at least three clips 44, e.g., five clips 44 as shown in FIG. 2. The clips 44 may extend from the cap surface 20.

As described above, the cap 18 may define the circumference 42, and the clips 44 may be substantially equally spaced along the circumference 42. For example, as shown in FIG. 2, the cap 18 may include five clips 44 spaced at substantially 72 degree intervals around the circumference 42. Alternatively, the clips 44 may be spaced in a suitable arrangement along the circumference 42.

The clips 44 may engage the inner surface 38 of the ledge 36. Each clip 44 may include an angled surface 46 engaged with the inner surface 38. When the angled surface 46 of the clip 44 engages the inner surface 38 of the ledge, the tensile force of the clip 44 urges the stop 26 into the outer surface 40 of the ledge 36, providing counteracting forces against the ledge 36 to secure the cap 18 to the wheel 12. That is, the angled surface 46 of the clip 44 may be designed to slide against the inner surface 38 of the ledge 36 such that the clip 44 forms a snap fit with the ledge 36 and provides a force extending out from the wheel 12. The resultant force from the ledge 36 drives the clip 44 away from the ledge 36, forcing the stop 26 into the outer surface 40 of the ledge 36. The force from the stop 26 against the ledge 36 prevents further intrusion of the cap 18 toward the wheel 12, securing the cap 18 at the specified depth.

The cap 18 may include a number of stops 26 and a number of clips 44 equaling the number of bolt receivers 34 of the wheel 12. That is, as shown in FIGS. 1-3, the wheel 12 may include five bolt receivers 34, and the cap may include five stops 26 and five clips 44. As shown in FIG. 2, two of the five stops 26 are part of positioning posts 22 and are fixed to respective pillars 24. Alternatively, the cap 18 may include a suitable number of stops 26 and a suitable number of clips 44, either or both of which may be a different number than the number of bolt receivers 34.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A wheel assembly, comprising:
   a wheel having a surface and defining a plurality of slots; and
   a cap having a cap surface and including a plurality of positioning posts extending from the cap surface, each positioning post including a pillar and a stop fixed to the pillar, the pillar extending farther from the cap surface than the stop, the stop having a distal end;
   each pillar received by one of the slots of the wheel and the distal end of each stop engaged with the surface of the wheel;
   the wheel includes a plurality of bolt receivers.

2. The wheel assembly of claim 1, wherein, when the slots receive the pillars, the cap is rotatably fixed relative to the wheel.

3. The wheel assembly of claim 1, wherein the cap defines a circumference and includes a plurality of stops substantially equally spaced along the circumference.

4. The wheel assembly of claim 1, wherein the wheel has a center and the slots define a chord extending away from the center.

5. The wheel assembly of claim 1, wherein the cap further includes a plurality of clips engaged with the surface of the wheel.

6. The wheel assembly of claim 5, wherein the cap defines a circumference and the clips are substantially equally spaced along the circumference.

7. The wheel assembly of claim 5, wherein the plurality of clips includes at least three clips.

8. The wheel assembly of claim 1, wherein each stop has a substantially arcuate cross-section.

9. The wheel assembly of claim 1, wherein each pillar has a substantially arcuate cross-section.

10. The wheel assembly of claim 1, wherein the cap surface and the positioning posts are unitary.

11. The wheel assembly of claim 1, wherein the cap includes a plurality of stops, the plurality of stops and the plurality of positioning posts equaling the plurality of bolt receivers.

12. The wheel assembly of claim 11, wherein the cap includes at least three clips.

13. The wheel assembly of claim 12, wherein the cap includes a plurality of clips that equals the plurality of bolt receivers.

14. The wheel assembly of claim 1, wherein the wheel includes a ledge and the surface of the wheel includes an outer surface of the ledge, and the distal end of each stop is engaged with the outer surface of the ledge.

15. The wheel assembly of claim 14, wherein the surface of the wheel includes an inner surface of the ledge and the cap includes a plurality of clips extending from the cap surface, each clip engaged with the inner surface of the ledge.

16. The wheel assembly of claim 1, wherein the slots are positioned to specify an orientation of the cap relative to the wheel when the positioning posts engage the slots.

17. The wheel assembly of claim 1, wherein the pillars are designed to prevent rotation of the cap upon receipt by the slots.

18. A wheel assembly, comprising:
    a wheel defining a plurality of slots, the wheel having a ledge having an inner surface and an outer surface; and
    a cap having a cap surface and including a plurality of positioning posts extending from the cap surface, each positioning post including a pillar and a stop fixed to the pillar, the pillar extending farther from the cap surface than the stop, the stop having a distal end;
    each pillar received by one of the slots of the wheel and the distal end of each stop engaged with the surface of the wheel;
    the distal end of each stop is engaged with an outer surface of the ledge; and
    the cap including a plurality of clips extending from the cap surface, each clip being engaged with the inner surface of the ledge.

19. The wheel assembly of claim 18, wherein each clip includes an angled surface engaged with the inner surface of the ledge.

20. The wheel assembly of claim 18, wherein the ledge defines at least two of the slots.

* * * * *